Patented Feb. 24, 1931

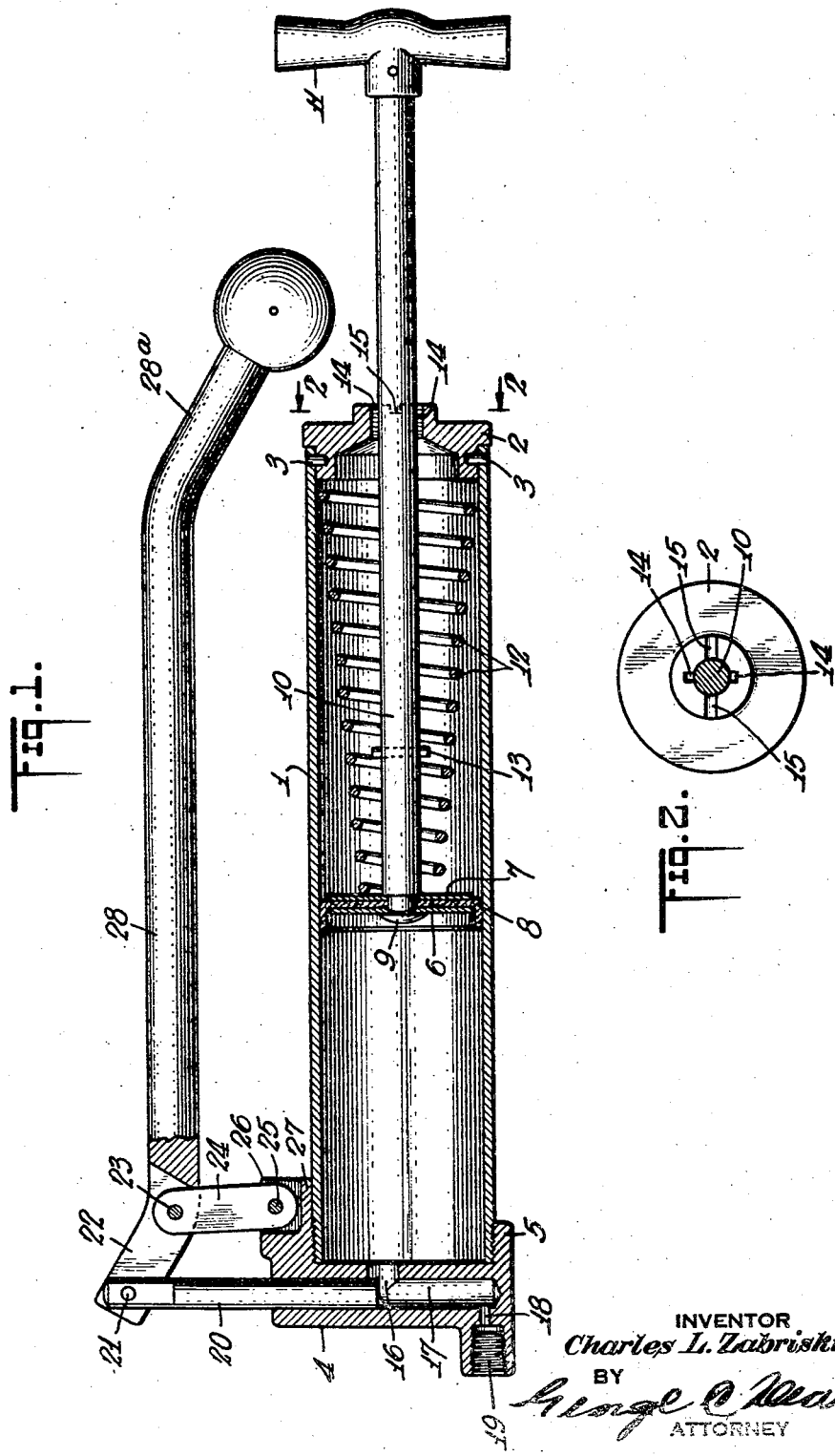

1,794,131

UNITED STATES PATENT OFFICE

CHARLES L. ZABRISKIE, OF NEW YORK, N. Y., ASSIGNOR, BY MESNE ASSIGNMENTS, TO ROGERS PRODUCTS CO., INC., A CORPORATION OF NEW JERSEY

LUBRICATING DEVICE

Original application filed January 27, 1926, Serial No. 84,101. Divided and this application filed October 1, 1928, Serial No. 309,445. Renewed August 7, 1930.

My present invention is disclosed in my application Serial No. 84,101, filed January 27, 1926, of which this case is a division. The same essential features are shown in slightly different combination in my prior application Serial No. 74,680, filed December 11, 1925, of which this case is a continuation in part.

As in said application Serial No. 84,101, the invention is shown as embodied in a device primarily designed for use as a grease gun for forcing grease through the ducts of bearings on automobiles and other machinery. The device includes a force-feed reservoir adapted to be charged with enough grease for lubricating many ducts, in combination with means for controlling and if desired boosting the pressure derived from the reservoir, the means shown including a plunger pump having an intake port adapted to be uncovered by the plunger so that the reservoir can discharge therethrough at moderate pressures. If this pressure is not sufficient, the plunger may be operated as a single-acting force pump.

A practically important detail of the device herein claimed relates to the recharging of the reservoir with grease after it has been emptied. The reservoir is a cylinder having a rigidly secured closure at one end through which slides a rod having a piston at its lower end and encircled by a powerful spring adapted to forcefeed the grease from the reservoir toward the opposite end of the cylinder, the latter end being detachably screw-threaded to another closure having the outlet and means for controlling outflow of grease therethrough.

The piston rod has an exterior handle and is formed or provided adjacent to the piston with a radial enlargement preferably in the form of projecting studs. The end closure of the cylinder has corresponding passages through which said studs may be withdrawn when the piston is retracted to fill the same with grease. The studs may be shifted out of registry with these passages by rotation of the rod in which position they serve as detents to hold the piston in the retracted position against the pressure of the spring. Preferably there are other locking recesses on the outer face of the closure into which the lugs may be forced by the spring. In this position the handle and rod may be used as a wrench to unscrew the cylinder for filling, or to screw it in place again after filling.

The above and other features of my invention will be more evident from the following description in connection with the accompanying drawings, in which Fig. 1 is a longitudinal section in a plane including the axis of the reservoir and also the axis of the pump chamber; and Fig. 2 is a detail section on the line 2—2, Fig. 1.

The reservoir comprises the cylinder, 1, closed, preferably permanently, by flanged closing plug 2, secured by pin rivets, 3, 3. The other end of the reservoir cylinder is closed by fitting, 4, having an internally screw-threaded flange, 5, engaged by an exterior thread on the end of the cylinder 1.

The means for applying pressure on the grease in the cylinder is shown as comprising a piston, which may consist simply of discs, 6, 7, between which is clamped the body portion of a cup washer, 8, as by riveting the head, 9, of the piston guide-rod, 10, which extends through the rear closure, 2, and may be provided with a handle, 11. The piston may have pressure applied to it in any desired way, as by spiral spring, 12, the resilience of which will be designed to normally force the piston to the extreme position where all of the grease has been expelled through the fitting, 4. Preferably, the piston rod, 10, is provided with a cross-pin, 13, adapted to be withdrawn through slots, 14, to fully retract the piston against the pressure of the spring. The slots, 14, serve as vents or breather holes to permit escape of air when the piston is retracted and also to admit air behind the piston during its forward, force-feeding movement. The piston and spring may be held in a retracted position by rotating the rod, 10, to bring the pin, 13, out of registry with slots, 14, and, if desired, notches, 15, may be formed in a boss in the rear end of closure, 2, in which the pin, 13, may be seated and held from displacement by pressure of the compressed spring. In this position, the handle, 11, may be used as a wrench to unscrew the cylinder from the fitting, 4. Grease may be then charged in through the open end of the detached cylinder, and thereafter the cylinder may be again screwed to position and the piston released by rotating the rod, 10, to permit the pins to pass through the slots, 14, under the influence of the spring, 12. Thereafter, the spring will apply substantial pressure for feeding the grease and this may be supplemented by further hand pressure through the handle, 11. In the position of parts shown in the drawings, grease under such pressure will flow freely through a pump intake, 16, into a pump cylinder, 17, and out through a pump outlet, 18, for discharge through any suitable coupling member that may be screwed into the nozzle, 19. Such reservoir feed of grease may be stopped at any time either by advancing the pump plunger, 20, until the inlet port, 16, is covered thereby or by retracting the piston as described above.

The plunger, 20, is connected by pivot, 21, with fork lever arm, 22, fulcrumed on pivot 23, link, 24, and pivot, 25, by which the link is secured between suitable guiding faces, 26, in an extension, 27, of fitting, 4. The long power arm of the lever, 28, preferably has its hand grasp end, 28a, curved toward the reservoir cylinder, 1, so that as the plunger approaches the end of a feeding stroke, said handle becomes more nearly parallel with the cylinder which forms a cooperating hand grasp for forcibly reciprocating the pump.

I claim:

1. A reservoir for lubricant having end closures, one normally locked against rotation and the other rotatably and detachably secured, the latter closure being provided with a service outlet and means for controlling outflow of grease therethrough; a piston within the reservoir and spring means for applying pressure thereon to force the lubricant toward the outlet; means extending through the non-rotating end closure for retracting the piston for refilling of the reservoir through the outlet end; lateral projections associated with the piston retracting means and corresponding openings through which they may be withdrawn through the normally closed end closure for rotation out of registry therewith to retain the piston in retracted position; and means for locking said projections against rotary movement with respect to the reservoir, whereby the retracting means may be employed as a wrench to rotate the reservoir to attach or detach the same from the outlet closure.

2. A reservoir for lubricant having end closures, one normally locked against rotation and the other rotatably and detachably secured, the latter closure being provided with a service outlet and means for controlling outflow of grease therethrough; a piston within the reservoir and spring means for applying pressure thereon to force the lubricant toward the outlet; means extending through the non-rotating end closure for retracting the piston for refilling of the reservoir through the outlet end; said retracting means and reservoir including releasably interlocking elements, whereby the retracting means may be used as a wrench for rotating and disengaging the reservoir from the outlet end closure.

3. A reservoir for lubricant having end closures, one of which is rotatably and detachably secured, and is provided with a service outlet and means for controlling outflow of grease therethrough; a piston within the reservoir and spring means for applying pressure thereon to force the lubricant toward the outlet end; a piston rod extending through the other end closure and provided with an exterior handle for retracting the piston for refilling of the reservoir through the outlet end; a lateral projection on the piston rod and a coacting element on the closure adapted to be engaged by said projection upon a longitudinal movement of the piston rod, whereby the reservoir may be rotated to detach same from the outlet closure.

4. A reservoir for lubricant having end closures, one of which is rotatably and detachably secured, and is provided with a service outlet and means for controlling outflow of grease therethrough; a piston within the reservoir and spring means for applying pressure thereon to force the lubricant toward the outlet end; a piston rod extending through the other end closure and provided with an exterior handle for retracting the piston for refilling of the reservoir through the outlet end; a lateral projection on the piston rod and a coacting element on the closure adapted to be engaged by said projection upon a longitudinal movement of the piston rod to retain the piston in retracted position against the pressure of the spring, whereby the reservoir may be rotated to detach same from the outlet closure.

Signed at Cooperstown, in the county of Otsego and State of New York this 28th day of September, A. D. 1928.

CHARLES L. ZABRISKIE.